US009117643B2

(12) United States Patent
Toyoda et al.

(10) Patent No.: US 9,117,643 B2
(45) Date of Patent: Aug. 25, 2015

(54) ALKALI METAL INTRODUCTION APPARATUS AND ALKALI METAL INTRODUCTION METHOD

(75) Inventors: Michisato Toyoda, Suita (JP); Hirofumi Nagao, Suita (JP); Shuichi Shimma, Suita (JP); Shigeo Hayakawa, Kawachinagano (JP)

(73) Assignee: OSAKA UNIVERSITY, Osaka (JP)

( * ) Notice: Subject to any disclaimer, the term of this patent is extended or adjusted under 35 U.S.C. 154(b) by 460 days.

(21) Appl. No.: 13/580,047

(22) PCT Filed: Jan. 25, 2011

(86) PCT No.: PCT/JP2011/051294
§ 371 (c)(1),
(2), (4) Date: Aug. 20, 2012

(87) PCT Pub. No.: WO2011/102188
PCT Pub. Date: Aug. 25, 2011

(65) Prior Publication Data
US 2012/0321433 A1 Dec. 20, 2012

(30) Foreign Application Priority Data
Feb. 22, 2010 (JP) ................................ 2010-035683

(51) Int. Cl.
*B65G 65/00* (2006.01)
*H01J 49/04* (2006.01)

(52) U.S. Cl.
CPC ................................ *H01J 49/0459* (2013.01)

(58) Field of Classification Search
CPC .................................................. H01J 49/0459
USPC ................................................ 414/804, 160
See application file for complete search history.

(56) References Cited

U.S. PATENT DOCUMENTS 4,516,052 A * 5/1985 Prewett et al. ................ 313/546
6,373,051 B1 4/2002 Hayakawa
(Continued)

FOREIGN PATENT DOCUMENTS

JP 63-195762 U 12/1988
JP 5-28949 2/1993
(Continued)

OTHER PUBLICATIONS

Kitaguchi, H., "Dissociation of Excited Neutral Fatty Acid Ester and Electron Transfer Dissociation of Polyvalent Ions" Master's thesis (Mar. 2006), Department of material science, Graduate school of science, Osaka Prefecture University.
(Continued)

*Primary Examiner* — Scott Kastler
(74) *Attorney, Agent, or Firm* — Casimir Jones, S.C.

(57) ABSTRACT

An alkali metal introduction apparatus (1) includes: a dedicated fracture chamber (10) and a vacuum chamber (20); vacuum pumps (60*a*) and (60*b*) for evacuating the insides of the dedicated fracture chamber (10) and the vacuum chamber (20); an ampul fracturing section for causing, in the dedicated fracture chamber (10), an alkali metal encapsulated in an ampul (16) to be exposed out of the ampul (16) by deforming the ampul (16); a collision cell (40) configured to allow the ampul (16) to be introduced therein, the collision room (40) being provided inside the vacuum chamber (20); and an ampul introducing section (12) for moving the ampul (16) between an exposure position where the alkali metal encapsulated in the ampul (16) is to be exposed out of the ampul (16) thus deformed and an introduction position where the ampul (16) is to be introduced into the collision cell (40).

6 Claims, 8 Drawing Sheets

(56) References Cited

U.S. PATENT DOCUMENTS

| | | | |
|---|---|---|---|
| 2006/0049755 | A1 | 3/2006 | Watanabe et al. |
| 2006/0263300 | A1 | 11/2006 | Hattori et al. |

FOREIGN PATENT DOCUMENTS

| | | | |
|---|---|---|---|
| JP | 2000-241390 | A | 9/2000 |
| JP | 2003-315313 | A | 11/2003 |
| JP | 2006-322802 | A | 11/2006 |
| WO | 2004/066339 | | 8/2004 |

OTHER PUBLICATIONS

Nagano, H., et al., "Development of a Tandem Mass Spectrometry Instrument for Probing High-Energy Electron Transfer Dissociation" J. Mass. Spectrom. Soc. Jpn.., 57 (2009) 123-132.

Hayakawa, S., et al., "Study of the dissociation of a charge-reduced phosphopeptide formed by electron transfer from an alkali metal target" Rapid Comm. Mass Spectrom., 22 (2008) 567-572.

Kaneko, O., "Applications: Application of Negative Ions for Nuclear Fusion Research" Journal of Plasma and Fusion Research vol. 72(11) (Nov. 1996), 1150-1155.

Hayakawa, S., et al., "Definitive evidence for the existence of isomeric chlorophenyl radicals (c6H4CI*) from charge inversion mass spectrometry and DFT calculations" ScienceDirect International Journal of Mass Spectrometry 262 (2007) 220-231.

Nagao, H., et al., "Development of a tandem time-of-flight mass spectrometer with an electrospray ionization ion source," Journal of Mass Spectrometry, vol. 45, Issue 8 (Aug. 2012), 937-943.

Hayakawa, "Charge inversion mass spectrometry: dissociation of resonantly neutralized molecules" J. Mass Spectrom. 2004; 39: 111-135.

Hayakawa, S., et al., "Differences between the internal energy depositions induced by collisional activation and by electron transfer of W(Co)2+6 ions on collision with Ar and K targets," The Journal of Chemical Physics 124, 224320 (2006).

Hayakawa, S., et al., "Dissociation mechanisms of neutral methyl stearate and its hydrogen atom adduct formed from the respective positive ions by electron transfer," J. Mass Spectrom. 2006; 41: 1226-1231.

* cited by examiner

ALKALI METAL INTRODUCTION APPARATUS AND ALKALI METAL INTRODUCTION METHOD

CROSS REFERENCE TO RELATED APPLICATIONS

The present application is a Section 371 U.S. national stage entry of pending International Patent Application No. PCT/JP2011/051294, International Filing Date Jan. 25, 2011, which published on Aug. 25, 2011 as Publication No. WO 2011/102188A1, which claims the benefit of Japanese Patent Application No. 2010-035683, filed Feb. 22, 2010, the contents of which are incorporated by reference in their entireties.

TECHNICAL FIELD

The present invention relates to a highly usable alkali metal introduction apparatus and an alkali metal introduction method.

BACKGROUND ART

In recent years, development has been in progress on soft ionization such as matrix-assisted laser desorption ionization (MALDI) and electrospray ionization (ESI). Along with this, mass spectrometry has been increasingly used to analyze biopolymers such as proteins and peptides.

At present, tandem mass spectrometry (MS/MS: mass spectrometer/mass spectrometer) is widely used to analyze the structures of such biopolymers. According to the tandem mass spectrometry, generally, two mass spectrometers are connected to each other. The first mass spectrometer selects ions having a predetermined mass-to-charge ratio (m/z), which ions are then directed into a collision room where they collide with a target gas and are dissociated (CID: Collision-induced dissociation). Then, the second mass spectrometer mass analyzes generated fragment ions to obtain structural information such as an amino acid sequence.

The target gas used here is generally an inert gas. Note however that, in a few cases, an alkali metal vapor is used as a target gas. Examples of such a case are disclosed in for example Non Patent Literatures 1 to 3.

CITATION LIST

Non Patent Literatures

Non Patent Literature 1

Hiroaki KITAGUCHI, "Dissociation of excited neutral fatty acid ester and electron transfer dissociation of polyvalent ions (*Reiki chusei sibousan esteru no kairi oyobi takaion no denshiidoukairi*)", Master's thesis (2005) in the field of material design, Department of material science, Graduate of science, Osaka Prefecture University Non Patent Literature 2

Hirofumi NAGAO et al., J. Mass Spectrom. Soc. Jpn., 57 (2009) 123-132

Non Patent Literature 3

S. HAYAKAWA et al., Rapid Commun. Mass Spectrom., 22 (2008) 567-572

SUMMARY OF INVENTION

Technical Problem

However, in the case where an alkali metal vapor is used as a target gas, the following problem occurs. The problem is described below with reference to FIG. 11.

FIG. 11 shows product ion spectra each showing the results of a structural analysis of a phosphorylated peptide (amino acid sequence: YGGMHRQETpVDC, wherein p represents phosphate group). (a) of FIG. 11 shows the results of a structural analysis obtained in a case where a target gas is an inert gas. (b) of FIG. 11 shows the results of a structural analysis obtained in a case where a target gas is an alkali metal vapor. In both (a) and (b) of FIG. 11, the horizontal axis indicates mass-to-charge ratio (m/z) and the vertical axis indicates peak intensity (arbitrary unit, hereinafter referred to as "a.u.").

As is clear from the spectra, in (a) of FIG. 11, a peak of undissociated precursor ions is observed mainly only at m/z 750, which is indicated as $[M+2H]^{2+}$ in (a) of FIG. 11. On the other hand, in (b) of FIG. 11, many peaks of fragment ions are observed not only at m/z 750 but also at other mass-to-charge ratios. That is, by use of an alkali metal vapor as a target gas, it is possible to create many peaks of fragment ions. These fragment ions serve as an important information source, because intervals between their peaks specify an amino acid sequence and types and positions of modification groups. For this reason, the use of an alkali metal vapor as a target gas makes it possible to obtain various structural information that cannot be obtained when the target gas is an inert gas, and thus possible to dramatically improve accuracy of the structural analysis. That is, an alkali metal vapor is advantageous over an inert gas when used as a target gas for a structural analysis. This is also described in Non Patent Literatures 2 and 3.

As described above, an alkali metal vapor is advantageous over an inert gas when used for a structural analysis. In spite of this, generally an inert gas is used as a target gas, for the following reasons. The reasons are described below with reference to FIG. 12. FIG. 12 is a view for schematically describing a conventional alkali metal introduction apparatus 100 for MS/MS in which an alkali metal vapor is used as a target.

The conventional alkali metal introduction apparatus 100 includes a reservoir 102 in which an alkali metal 112 is introduced, a path 104 through which an alkali metal vapor flows, a vacuum chamber 106, a heater 108 which is provided to the path 104 and which heats the alkali metal vapor, and a vacuum pump 110 (not illustrated). Since the details of these constituents are disclosed in Non Patent Literature 3, descriptions of the details are omitted here.

According to the alkali metal introduction apparatus 100 which handles an alkali metal vapor in a vacuum container, it is necessary to (i) safely introduce the alkali metal 112 into the reservoir 102 and heat the alkali metal 112 with the heater 108 to vaporize the alkali metal 112 to produce an alkali metal vapor and (ii) introduce the alkali metal vapor into the vacuum chamber 106. To this end, first, it is necessary to fracture, under nitrogen atmosphere and dry conditions, an ampul in which the alkali metal 112 is encapsulated. Then, the vacuum of the vacuum chamber 106 is released, the alkali metal 112 is quickly introduced from the fractured ampul into the reservoir 102, and then the vacuum chamber 106 is evacuated by the vacuum pump 110.

However, according to the conventional alkali metal introduction apparatus 100, the step of fracturing the ampul under nitrogen atmosphere is carried out outside the system of the alkali metal introduction apparatus 100.

More specifically, first, the entire alkali metal introduction apparatus 100 is covered with a transparent plastic bag, and air inside the bag is replaced by nitrogen gas. Next, an end portion of the ampul in which the alkali metal 112 is encapsulated is fractured so that the alkali metal is exposed out of the ampul. Then, the alkali metal 112 with the ampul is introduced into the reservoir 102.

This is dangerous because for example when the ampul fractured under nitrogen atmosphere is introduced into the reservoir 102, the alkali metal 112 may react with moisture in air to ignite. In addition to this, there are a lot of problems such as (i) a problem in which if the alkali metal 112 makes contact with an operator's hand, the operator's hand will be burned and (ii) a problem in which if the alkali metal 112 is spilt on a floor, the floor cannot be cleaned with water because of the properties of the alkali metal.

As has been described, although it has been recognized that an alkali metal vapor is advantageous as a target gas, an inert gas is used because of difficulty in handling the alkali metal.

The present invention has been made in view of the above conventional problems, and an object of the present invention is to provide a highly usable alkali metal introduction apparatus and an alkali metal introduction method.

Solution to Problem

In order to attain the above object, an alkali metal introduction apparatus in accordance with the present invention is an alkali metal introduction apparatus for use in an experiment in which an alkali metal vapor is used, including: a hollow chamber; a vacuum creating section for evacuating the chamber; an exposing section for causing, in the chamber, an alkali metal encapsulated in an encapsulation container to be exposed out of the encapsulation container by deforming the encapsulation container; a container introduction room configured to allow the encapsulation container to be introduced therein, the container introduction room being provided inside the chamber; and a container moving section for moving the encapsulation container between an exposure position where the alkali metal is to be exposed out of the encapsulation container thus deformed and an introduction position where the encapsulation container is to be introduced into the container introduction room.

In order to attain the above object, an alkali metal introduction method in accordance with the present invention is an alkali metal introduction method for use in an experiment in which an alkali metal vapor is used, including the steps of: evacuating a hollow chamber in which an encapsulation container is located, in which encapsulation container an alkali metal is encapsulated, and thereafter; causing the alkali metal to be exposed out of the encapsulation container by deforming the encapsulation container and thereafter; moving the encapsulation container between an exposure position where the alkali metal is exposed out of the encapsulation container thus deformed and an introduction position where the encapsulation container is to be introduced into a container introduction room, the container introduction room being provided inside the chamber and configured to allow the encapsulation container to be introduced therein.

In conventional experiments in which alkali metal vapors are used, for example in a case of tandem mass spectrometry, it has been known that using an alkali metal vapor as a target gas dramatically improves the accuracy of a structural analysis as compared to the case where an inert gas is used as the target gas. In spite of this, in general, an inert gas is more often used as a target gas. This is due to difficulty in handling alkali metals. Alkali metals ignite when they react with moisture in air, and cause burn injury when they make contact with a hand. This is why the use of alkali metals as target gases has been avoided and spread of them has been hampered.

In this regard, according to the alkali metal introduction apparatus (alkali metal introduction method) in accordance with the present invention, the vacuum creating section (step of creating a vacuum) evacuates the hollow chamber. Then, the exposing section (step of causing the alkali metal to be exposed) causes, in the chamber, the alkali metal encapsulated in the encapsulation container to be exposed out of the encapsulation container by deforming the encapsulation container. Further, the container moving section (step of moving the encapsulation container) moves the encapsulation container between the exposure position where the alkali metal is to be exposed out of the encapsulation container thus deformed and the introduction position where the encapsulation container is to be introduced into the container introduction room which is provided inside the chamber and is configured to allow the encapsulation container to be introduced therein. As such, the alkali metal introduction apparatus (alkali metal introduction method) in accordance with the present invention makes it possible to introduce, into the container introduction room, the encapsulation container out of which the alkali metal is exposed.

Specifically, according to the alkali metal introduction apparatus (alkali metal introduction method) in accordance with the present invention, the exposing section (step of causing the alkali metal to be exposed) causes, in the chamber, the alkali metal encapsulated in the encapsulation container to be exposed out of the encapsulation container by deforming the encapsulation container. Since the hollow chamber has been evacuated by the vacuum creating section (step of creating a vacuum), moisture inside the chamber has been discharged out of the chamber. Therefore, it is possible to prevent the alkali metal from reacting with moisture inside the chamber and igniting.

Further, the alkali metal encapsulated in the encapsulation container is caused, in the chamber, to be exposed out of the encapsulation container by deformation of the encapsulation container by the exposing section (step of causing the alkali metal to be exposed). Therefore, it is possible to eliminate the risk of the alkali metal making contact with an operator's hand etc. and causing burn injury to the operator.

As such, it is possible to safely introduce, into the container introduction room, an alkali metal whose use has been avoided due to difficulty in handling thereof. This makes it possible for an operator to choose to use the alkali metal introduction apparatus (alkali metal introduction method) in accordance with the present invention in an experiment, such as tandem mass spectrometry, in which an alkali metal vapor is used. Using the alkali metal introduction apparatus (alkali metal introduction method) in accordance with the present invention in tandem mass spectrometry makes it possible to maximize the advantage of alkali metal vapors over inert gases, which advantage is brought about when an alkali metal vapor is used for a structural analysis.

Further, according to the alkali metal introduction apparatus (alkali metal introduction method) in accordance with the present invention, the encapsulation container in which an alkali metal is encapsulated is directly introduced into the container introduction room. Therefore, in a case where the container introduction room is used as a collision room (hereinafter may be referred to as "collision cell") where selected ions collide with a target gas in tandem mass spectrometry, the alkali metal is directly introduced into the collision room. This means that the path described with reference to FIG. 12 is not necessary.

Specifically, according to an alkali metal introduction system as has been used conventionally, an alkali metal is first introduced into a reservoir where it is vaporized to produce an alkali metal vapor, and the alkali metal vapor is guided through the path to the collision room inside the vacuum chamber. In contrast, according to the alkali metal introduction apparatus (alkali metal introduction method) in accordance with the present invention configured like above, it is possible to omit the path to thereby simplify the apparatus and further to cut down on cost. In addition, by omitting the pass, it is also possible to enjoy the following advantages. That is, complicated temperature controls are not necessary, and loss of an alkali metal vapor while the alkali metal vapor is guided to the collision room is prevented.

The alkali metal introduction apparatus in accordance with the present invention is preferably configured such that the container moving section includes a container sealing section for sealing an introduction opening in the container introduction room into which the encapsulation container is to be introduced.

According to the alkali metal introduction apparatus in accordance with the present invention configured like above, the introduction opening in the container introduction room is sealed with the container sealing section. Therefore, even if some process is carried out in the container introduction room after the encapsulation container is introduced into the container introduction room, a product obtained from the process is prevented from leaking out of the container introduction room. This provides a safer apparatus to an operator.

The alkali metal introduction apparatus in accordance with the present invention preferably further includes a heating system capable of raising the temperature inside the container introduction room.

Into the container introduction room, the encapsulation container in which an alkali metal is encapsulated is introduced. The alkali metal has been exposed out of the encapsulation container by the exposing section.

Accordingly, the alkali metal introduction apparatus in accordance with the present invention, which includes the heating system capable of raising the temperature inside the container introduction room, makes it possible to vaporize the alkali metal exposed out of the encapsulation container.

Accordingly, in experiments in which alkali metal vapors are used, for example in the case of tandem mass spectrometry, it is possible to use an alkali metal vapor as a target gas, and thus possible to dramatically improve the accuracy of a structural analysis as compared to the case where an inert gas is used as the target gas.

The configuration also brings about the following effect.

A conventional alkali metal introduction system controls the temperature (gas density) of an alkali metal vapor with use of not only a heater provided to the collision room but also a heater provided to the path. Therefore, even if the alkali metal is safely introduced into the reservoir, the density of an alkali metal vapor cannot be controlled accurately with high responsivity. Under such circumstances, it is often the case that (i) the alkali metal vapor takes several hours to reach its target density or (ii) if the density of the alkali metal vapor jumps due to inappropriate control, a large amount of an alkali metal is unnecessarily consumed.

In contrast, the alkali metal introduction apparatus in accordance with the present invention does not require the path which is required for the conventional alkali metal introduction system as described earlier, and is capable of directly introducing the alkali metal into the container introduction room. Further, the alkali metal introduction apparatus in accordance with the present invention includes the heating system which is capable of raising the temperature inside the container introduction room.

Accordingly, the alkali metal introduction apparatus in accordance with the present invention is capable of controlling the gas pressure of the alkali metal vapor inside the container introduction room with use of only the heating system, and thus is capable of controlling the gas pressure with significantly high responsivity. This makes it possible to prevent a large amount of an alkali metal from being unnecessarily consumed due to inappropriate control.

The alkali metal introduction apparatus in accordance with the present invention preferably further includes a cooling system capable of reducing the temperature inside the container introduction room.

A conventional alkali metal introduction system includes the heater provided to the path and to the collision room, but does not include a system of cooling heated gas.

Therefore, even if the density of an alkali metal vapor jumps due to inappropriate control, the conventional alkali metal introduction system cannot address this and just has to wait for the alkali metal vapor to decrease in temperature on its own. This results in unnecessary consumption of the alkali metal.

In contrast, the alkali metal introduction apparatus in accordance with the present invention includes the cooling system capable of reducing the temperature inside the container introduction room.

Accordingly, the alkali metal introduction apparatus in accordance with the present invention is capable of quickly cooling the alkali metal vapor by the cooling system when the temperature of the alkali metal vapor exceeds the target temperature. That is, it is possible to control the gas pressure of the alkali metal vapor with higher responsivity, and thus possible to reduce unnecessary consumption of the alkali metal.

The alkali metal introduction apparatus in accordance with the present invention is preferably configured such that: the heating system is a system of raising the temperature inside the container introduction room by use of a heater; and the cooling system is a system of reducing the temperature inside the container introduction room by use of liquid nitrogen.

Controlling the temperature with use of the heater and liquid nitrogen is a technique used in plants etc. The technique is capable of high-speed control of the temperature within ±0.5° C. of the set target temperature.

In view of this, by applying this technique to the field of the present invention, it is possible to carry out high-speed control of the gas pressure of the alkali metal vapor inside the container introduction room. That is, with use of the heating system using the heater and the cooling system using liquid nitrogen, it is possible to carry out high-speed control of the temperature within ±0.5° C. of the set target temperature, and thus possible to realize a "high-speed switch by heat". This makes it possible to precisely control the amount of gas by switching operation of the "high-speed switch", and thus possible to realize a configuration in which an alkali metal is consumed in pulses.

As has been described, the alkali metal introduction apparatus in accordance with the present invention configured like above brings about the effect of optimizing alkali metal consumption.

Advantageous Effects of Invention

As has been described, an alkali metal introduction apparatus in accordance with the present invention includes: a hollow chamber; a vacuum creating section for evacuating the chamber; an exposing section for causing, in the chamber, an alkali metal encapsulated in an encapsulation container to be exposed out of the encapsulation container by deforming the encapsulation container; a container introduction room configured to allow the encapsulation container to be introduced therein, the container introduction room being provided inside the chamber; and a container moving section for moving the encapsulation container between an exposure position where the alkali metal is to be exposed out of the encapsulation container thus deformed and an introduction position where the encapsulation container is to be introduced into the container introduction room.

Further, as has been described, an alkali metal introduction method in accordance with the present invention includes the steps of: evacuating a hollow chamber in which an encapsulation container is located, in which encapsulation container an alkali metal is encapsulated, and thereafter; causing the alkali metal to be exposed out of the encapsulation container by deforming the encapsulation container and thereafter; moving the encapsulation container between an exposure position where the alkali metal is exposed out of the encapsulation container thus deformed and an introduction position where the encapsulation container is to be introduced into a container introduction room, the container introduction room being provided inside the chamber and configured to allow the encapsulation container to be introduced therein.

Accordingly, it is possible to realize a highly usable alkali metal introduction apparatus and an alkali metal introduction method.

BRIEF DESCRIPTION OF DRAWINGS

FIG. 4 shows various configurations applicable to an ampul fracturing section. (a) of FIG. 4 shows a method of catching an ampul's upper part by a Y-wedge and turning the Y-wedge. (b) of FIG. 4 shows a method of stabbing (piercing) the ampul's upper part with a sharp object. (c) of FIG. 4 shows a method of crushing off the ampul's upper part with a screw etc. (d) of FIG. 4 shows a method of crushing the ampul's upper part by application of pressure from the top, right and left sides of the ampul's upper part. (e) of FIG. 4 shows a method of hitting the ampul's upper part with an object. (f) of FIG. 4 shows a method of fracturing the ampul's upper part by damaging the ampul's upper part with a blade or the like.

DESCRIPTION OF EMBODIMENTS

The following description discusses, with reference to the drawings, an alkali metal introduction apparatus 1 and an alkali metal introduction method in accordance with the present invention. In the following description, identical parts and identical constituents are assigned identical referential numerals and have the same names and functions. Therefore, their detailed descriptions are not repeated.

The following description discusses the alkali metal introduction apparatus 1. Note that, in consideration of the order of descriptions, an example of application of the alkali metal introduction apparatus 1 is described with reference to FIG. 2 and thereafter a configuration of the alkali metal introduction apparatus 1 is schematically described with reference to FIG. 1.

Example of Application of Alkali Metal Introduction Apparatus 1

Figure 2:
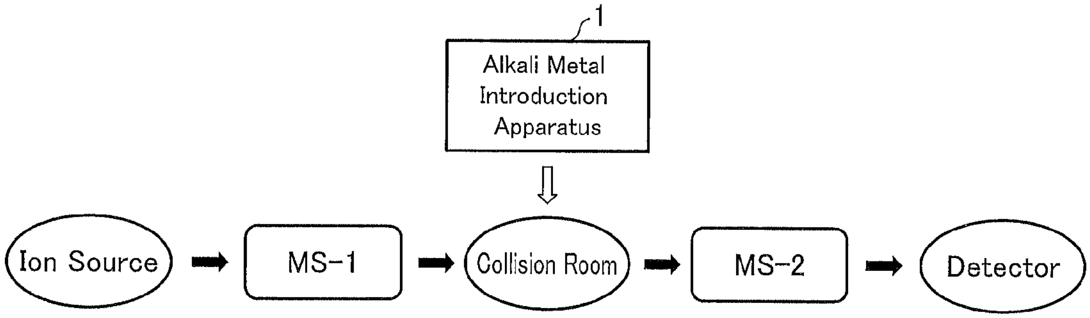
FIG. 2 is a view for schematically describing a flow of tandem mass spectrometry.

The following description discusses, with reference to FIG. 2, how the alkali metal introduction apparatus 1 is applied to tandem mass spectrometry (MS/MS). FIG. 2 is a view for schematically describing a flow of tandem mass spectrometry.

As illustrated in FIG. 2, according to tandem mass spectrometry, generally two mass spectrometers are connected to each other via a collision room (hereinafter may be referred to as "collision cell"). The first mass spectrometer (MS-1) selects ions having a predetermined mass-to-charge ratio (m/z), which ions are then directed into the collision cell where they collide with a target gas and are dissociated. Then, the second mass spectrometer (MS-2) mass analyzes generated fragment ions to obtain structural information such as an amino acid sequence.

According to the tandem mass spectrometry thus configured, the alkali metal introduction apparatus 1 is used to introduce an alkali metal, which is to become a target gas, into the collision cell. Specifically, the alkali metal is introduced into the collision cell by the alkali metal introduction apparatus 1, and is vaporized by application of heat. An alkali metal vapor thus produced by vaporization is used as a target gas in the collision cell.

The above description schematically discussed the flow of the tandem mass spectrometry. It should be noted here that the alkali metal introduction apparatus 1 is applicable also to other purposes, and is applicable to for example an experiment on particle collision. For example, the alkali metal introduction apparatus 1 is applicable to: a surface analyzer such as a secondary ion mass spectrometer; a photomultiplier device; and a double charge exchange reaction in ITER (International Thermonuclear Experimental Reactor). Each of these is briefly described below.

The surface analyzer is one that (i) irradiates a surface of a sample with a beam of for example primary ions, neutral particles and/or laser light to thereby cause the surface of the sample to emit energetic particles such as secondary ions and/or neutral particles and (ii) measures the energy and mass etc. of the particles thus emitted. The alkali metal introduction apparatus 1 is used as a source of alkali metal ions with which the surface of the sample is to be irradiated.

The photomultiplier device is one that is capable of improving apparent light detection efficiency of a light detector by causing multiple reflection of incident light between the light detector and a photoelectric conversion surface, which light detector has low efficiency if a reflection occurs only once. The alkali metal introduction apparatus 1 is used as a source of an alkali metal (material for a photoelectric conversion surface) to be deposited and grown on a glass surface or to be applied to the glass surface.

The double charge exchange reaction in ITER is as follows. That is, there has been proposed a beam neutralization method, which is one of the methods of measuring alpha particles produced by D-T nuclear fusion reaction. According to the beam neutralization method, spatial profiles and velocity distributions of alpha particles are measured by (i) causing a $He^0$ beam to be incident on plasma which is confined in a nuclear fusion reactor by magnetic fields, (ii) neutralizing the alpha particles by a double charge exchange reaction between $He^0$ and the alpha particles, and (iii) taking out the alpha particles from the magnetic fields and measuring the alpha particles. The $He^0$ beam is produced by spontaneous desorption of a He-beam, and the He-beam is generated by allowing the He-beam from a He-ion source to pass through an alkali metal vapor cell and causing a double charge exchange reaction between the He-beam and the alkali metal vapor. That is, the alkali metal introduction apparatus 1 is used as a source of the alkali metal vapor.

As has been described, the alkali metal introduction apparatus 1 is applicable to various purposes.

Next, a specific configuration etc. of the alkali metal introduction apparatus 1 is described. Note that the following description is based on the assumption that the alkali metal introduction apparatus 1 is applied to tandem mass spectrometry.

Schematic Configuration of Alkali Metal Introduction Apparatus 1

Figure 1:
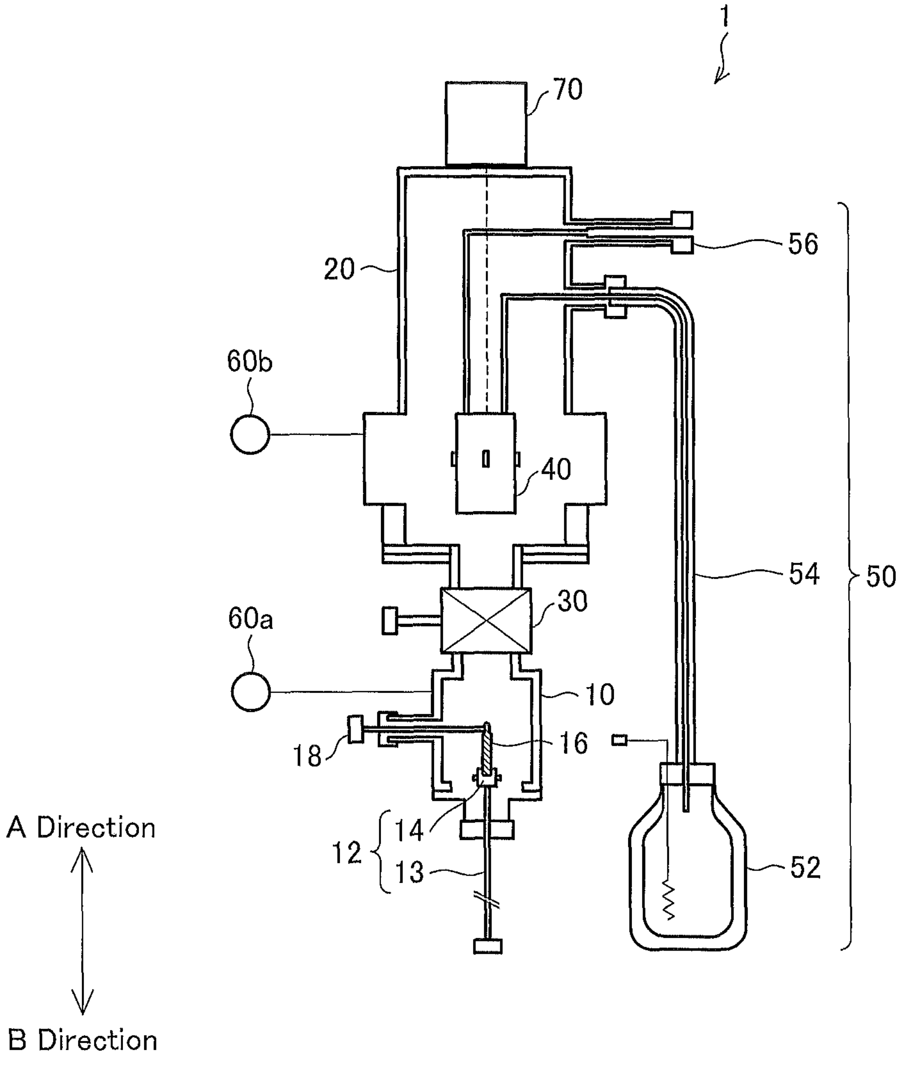
FIG. 1 is a view schematically illustrating an alkali metal introduction apparatus in accordance with the present invention

The following description schematically discusses a configuration of the alkali metal introduction apparatus 1 with reference to FIG. 1. FIG. 1 is a view schematically illustrating the alkali metal introduction apparatus 1.

The alkali metal introduction apparatus 1 is incorporated in tandem mass spectrometry, and is used to introduce an alkali metal into a collision cell 40.

The alkali metal introduction apparatus 1 includes a dedicated fracture chamber (chamber) 10, an ampul introducing section (container moving section) 12, an ampul fracturing section (exposing section) 18, a vacuum chamber (chamber) 20, a gate valve 30, the collision cell (container introduction room) 40, a temperature control system 50, vacuum pumps (vacuum creating section) 60*a* and 60*b*, and a position control device 70.

The dedicated fracture chamber 10, the gate valve 30, and the vacuum chamber 20 are arranged in this order from the bottom in the vertical direction. Note, however, that the dedicated fracture chamber 10, the gate valve 30, and the vacuum chamber 20 can be arranged in the horizontal direction or at an angle to the horizontal direction.

The dedicated fracture chamber 10 is a hollow chamber having empty space therein. The dedicated fracture chamber 10 is provided with at least the ampul introducing section 12 and the ampul fracturing section 18.

The ampul introducing section 12 is for moving an ampul (encapsulation container) 16 between (i) an exposure position where an alkali metal encapsulated in the ampul 16 is caused to be exposed out of the ampul 16 by deformation of the ampul 16 by the ampul fracturing section 18 and (ii) an introduction position where the ampul 16 is introduced into the collision cell 40. To achieve this, the ampul introducing section 12 is provided so as to be movable in a direction (A direction of FIG. 1) in which the ampul 16 is introduced into the collision cell 40 and in a direction (B direction of FIG. 1) in which the ampul 16 goes away from the collision cell 40. The ampul introducing section 12 includes an introduction shaft 13 and an ampul holder 14.

The ampul introducing section 12 needs to be taken out from the dedicated fracture chamber 10 when the ampul 16 is inserted into the ampul holder 14 (described later). Therefore, the ampul introducing section 12 is removably attached to the dedicated fracture chamber 10.

Figure 3:
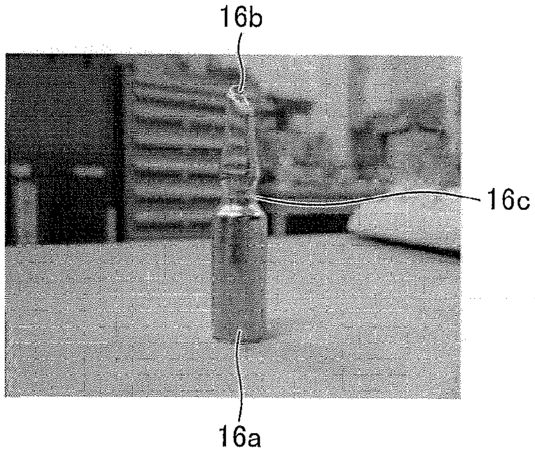
FIG. 3 is a photograph of an ampul.

The following description discusses the ampul 16 with reference to FIG. 3. FIG. 3 is a photograph of the ampul 16.

The ampul 16 can be a commercially available one. In the ampul 16, an alkali metal is encapsulated. As shown in FIG. 3, the ampul 16 is constituted by an ampul's lower part 16*a* having an approximate cylindrical shape and an ampul's upper part 16*b* provided on top of the ampul's lower part 16*a*. Further, the ampul 16 is configured to be easily broken at its border part 16*c* between the ampul's lower part 16*a* and the ampul's upper part 16*b* when external force is applied to the ampul's upper part 16*b*. This makes it possible to cause the alkali metal encapsulated in the ampul 16 to be exposed to outside air.

The alkali metal encapsulated in the ampul 16 is not limited to a particular kind, and therefore can be any of the alkali metals such as lithium, sodium, cesium and francium.

The introduction shaft 13 is in the form of a bar, and the ampul holder 14 is removably fastened to a tip portion of the introduction shaft 13. Note here that a position where an end portion of the ampul 16 is to be fractured, i.e., a position where an alkali metal encapsulated in the ampul 16 is caused to be exposed out of the ampul 16 by deformation of the ampul 16 by the ampul fracturing section 18, is referred to as an exposure position. Further note that a position where the ampul 16 is to be introduced into the collision cell 40 is referred to as an introduction position. Under such circumstances, the introduction shaft 13 in the form of a bar has a length that is equal to or larger than a distance from the exposure position to the introduction position.

According to FIG. 1, the introduction shaft 13 is provided to the dedicated fracture chamber 10 in parallel to a direction (A-B direction of FIG. 1) in which the dedicated fracture chamber 10, the gate valve 30 and the vacuum chamber 20 are connected to each other. Note, however, that the introduction shaft 13 (and the ampul introducing section 12) can have any shape and any configuration provided that the ampul 16 can be moved between (i) the exposure position where the alkali metal encapsulated in the ampul 16 is to be exposed out of the ampul 16 and (ii) the introduction position where the ampul 16 is to be introduced into the collision cell 40.

The ampul holder 14 is for holding the ampul 16 in which an alkali metal is encapsulated, and is provided to the tip portion of the introduction shaft 13.

How the ampul holder 14 holds the ampul 16 thereon is not particularly limited. Note, however, that the ampul holder 14 is brought into engagement with the collision cell 40 while holding the ampul 16 thereon, and then the collision cell 40 is heated so that the alkali metal encapsulated in the ampul 16 is vaporized. For this reason, the ampul holder 14 and the collision cell 40 need to be configured such that their portions in engagement with each other are sufficiently sealed and that the collision cell 40 is airtight.

In view of such circumstances, the portions of the ampul holder 14 and the collision cell 40, which portions are to be engaged with each other, are for example made in the form of a male screw and in the form of a female screw, respectively. This makes is possible to screw the ampul holder 14 into the collision cell 40 by turning the introduction shaft 13 so that those portions of the ampul holder 14 and the collision cell 40 are sufficiently in engagement with each other when they are brought into engagement.

The following description discusses relative positions of the ampul introducing section 12 and the collision cell 40. The following description is based on the assumption that the gate valve 30 is held in its "open" state.

As described earlier, the ampul introducing section 12 is for introducing the ampul 16 into the collision cell 40. Therefore, by moving the ampul introducing section 12 in the A direction, the ampul holder 14 is brought into engagement with (is screwed into) an opening (not illustrated) in the collision cell 40. To achieve this, the opening in the collision cell 40 is positioned on an axis of the introduction shaft 13.

Note that the position may be displaced due to vibration of the apparatus or the like. In such a case, the position control device 70 provided inside or outside the alkali metal introduction apparatus 1 controls the position of the collision cell 40. This adjusts the displacement. Such a position control device can be a known position control device, and therefore its detailed description is omitted here.

The following description discusses the ampul fracturing section 18.

The ampul fracturing section 18 is for deforming, in the dedicated fracture chamber 10, the ampul 16 to thereby cause an alkali metal encapsulated in the ampul 16 to be exposed out of the ampul 16. The ampul fracturing section 18 fractures the ampul 16 which is located inside the dedicated fracture chamber 10. In this way, the ampul fracturing section 18 causes the alkali metal encapsulated in the ampul 16 to be exposed out of the ampul 16 by deforming the ampul 16. The ampul fracturing section 18 is integral with the dedicated fracture chamber 10 or is removably attached to the dedicated fracture chamber 10.

Figure 4:
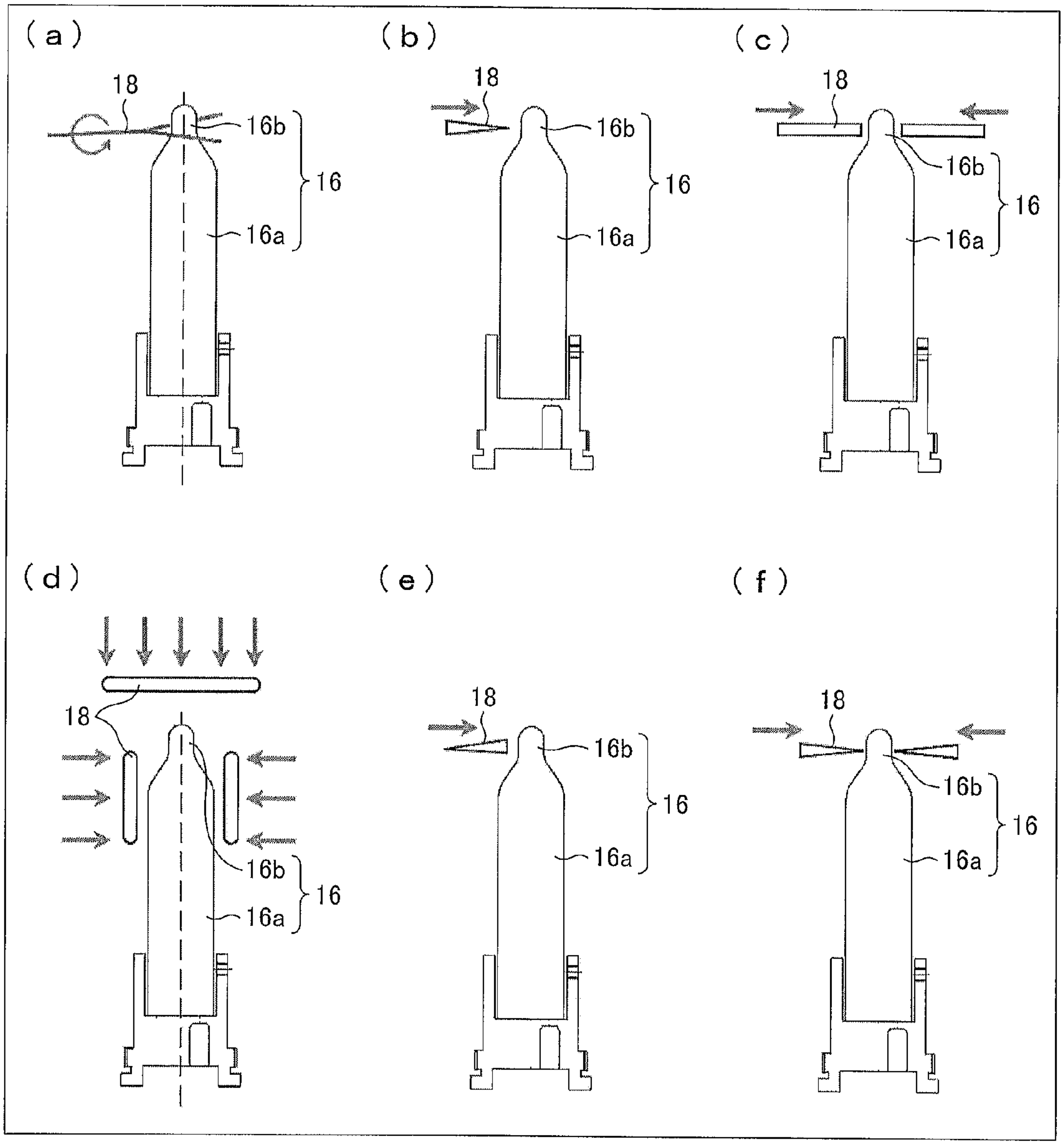

The following description discusses, with reference to FIG. 4, various configurations that are applicable to the ampul fracturing section 18.

(a) of FIG. 4 shows a method of catching an ampul's upper part 16*b* by a Y-wedge and turning the Y-wedge.

(b) of FIG. 4 shows a method of stabbing (piercing) the ampul's upper part 16*b* with a sharp object.

(c) of FIG. 4 shows a method of crushing off the ampul's upper part 16*b* with a screw etc.

(d) of FIG. 4 shows a method of crushing the ampul's upper part 16*b* by application of pressure from the top, right and left sides of the ampul's upper part 16*b*.

(e) of FIG. 4 shows a method of hitting the ampul's upper part 16*b* with an object.

(f) of FIG. 4 shows a method of fracturing the ampul's upper part 16*b* by damaging the ampul's upper part 16*b* with a blade or the like.

As has been described, the ampul fracturing section 18 can be realized by various methods. The alkali metal introduction apparatus 1 can employ any of these methods. It is needless to say that the ampul fracturing section 18 can be realized by a method other than those shown in FIG. 4.

The vacuum chamber 20 is a hollow chamber having empty space therein. The collision cell 40 is provided inside the vacuum chamber 20.

The gate valve 30 has a bottom face connected with the dedicated fracture chamber 10 and a top face connected with the vacuum chamber 20. That is, the dedicated fracture chamber 10 and the vacuum chamber 20 are connected to each other via the gate valve 30. The gate valve 30 brings the dedicated fracture chamber 10 and the vacuum chamber 20 into communication when it is in an "open" state, and separates the dedicated fracture chamber 10 and the vacuum chamber 20 when it is in a "closed" state.

The collision cell 40 is provided inside the vacuum chamber 20. The collision cell 40 has the opening (not illustrated), and is positioned so that the opening and the ampul holder 14 are brought into engagement with each other (screwed together) by moving the ampul introducing section 12 in the A direction and turning the introduction shaft 13. That is, the opening in the collision cell 40 is positioned on an axis of the introduction shaft 13.

The collision cell 40 is provided for the same purpose as that of a so-called general collision cell. Therefore, the detailed description of the collision cell 40 is omitted here.

The temperature control system 50 includes a liquid nitrogen container 52, a cooling line (cooling system) 54, and a heating line (heating system) 56.

The liquid nitrogen container 52 stores liquid nitrogen therein, and is provided with sufficient thermal insulation capacity so that the temperature of the liquid nitrogen does not increase.

The cooling line 54 is a pipe line provided between the liquid nitrogen container 52 and the collision cell 40. The liquid nitrogen is fed from the liquid nitrogen container 52 to the collision cell 40 by a pump (not illustrated), cools the temperature inside the collision cell 40, and thereafter is fed back to the liquid nitrogen container 52.

The heating line 56 is an electric cable for a heater provided to the collision cell 40. The heater is used to raise the temperature inside the collision cell 40.

Temperature control using the heater and liquid nitrogen is a technique used in plants etc., although it has not been used in this field. This technique is capable of controlling the temperature inside the collision cell 40 within ±0.5° C. of the target temperature. Detailed description of the temperature control is omitted here because the temperature control is a known technique.

The foregoing description is based on the assumption that liquid nitrogen passes through the cooling line 54. Note, however, that the cooling line 54 can be arranged to use for example liquid helium or dry ice etc. instead of liquid nitrogen.

The vacuum pump 60*a* is for evacuating the dedicated fracture chamber 10. The vacuum pump 60*b* is for evacuating the vacuum chamber 20.

The following description is based on the assumption that there are two vacuum pumps: the vacuum pump 60*a* and the vacuum pump 60*b*. Note, however, that it is possible to employ a configuration in which a single vacuum pump serves as both the vacuum pump 60*a* and the vacuum pump 60*b*.

Further, generally, a hollow container is evacuated with not only a vacuum pump but also a dedicated pipe, a valve and a vacuum buffer tank etc. However, since evacuating a hollow container is a well known technique, its detailed description is omitted here.

The dedicated fracture chamber 10 is evacuated with use of the vacuum pump 60*a*. To this end, the dedicated fracture chamber 10 is connected with a pipe (not illustrated in FIG. 1) that is connected to the vacuum pump 60*a*. Similarly, the vacuum chamber 20 is evacuated with use of the vacuum pump 60*b*. To this end, the vacuum chamber 20 is connected with a pipe (not illustrated in FIG. 1) that is connected to the vacuum pump 60*b*.

The position control device 70 is provided inside or outside the alkali metal introduction apparatus 1. The position control device 70 is for controlling the collision cell 40 provided inside the vacuum chamber 20 back into the correct position if the collision cell 40 is displaced due to vibration etc.

The foregoing description schematically discussed the configuration of the alkali metal introduction apparatus 1. Note here that each constituent of the alkali metal introduction apparatus 1 is preferably made from stainless steel, because the alkali metal introduction apparatus 1 handles alkali metals. Note, however, that the constituents of the alkali metal introduction apparatus 1 can be made from materials other than stainless steel.

The foregoing description was based on the assumption that the alkali metal introduction apparatus 1 includes the dedicated fracture chamber 10, the vacuum chamber 20 and the gate valve 30 and is configured such that the dedicated fracture chamber 10 and the vacuum chamber 20 are connected to each other via the gate valve 30.

Note, however, that the alkali metal introduction apparatus 1 can be configured without the gate valve 30. That is, the alkali metal introduction apparatus 1 can be configured such that the dedicated fracture chamber 10 is integral with the vacuum chamber 20.

How to Bring Ampul Holder 14 and Collision Cell 40 into Engagement

Figure 5:
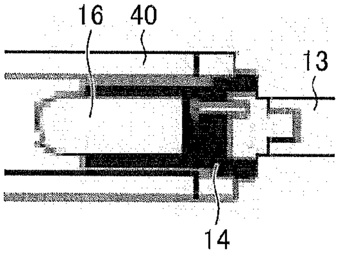
FIG. 5 is a view for describing how to bring an ampul holder and a collision cell into engagement.

The following description discusses, with reference to FIG. 5, how to bring the ampul holder 14 and the collision cell 40 into engagement. FIG. 5 is a view for describing how to bring the ampul holder 14 and the collision cell 40 into engagement. Descriptions of the same configurations as those described with reference to FIG. 1 are omitted here.

As described earlier, the ampul holder 14 is brought into engagement (fitted tightly into) with the collision cell 40 while holding the ampul 16 thereon, and the collision cell 40 is heated so that an alkali metal encapsulated in the ampul 16 is vaporized. For this reason, the ampul holder 14 and the collision cell 40 need to be configured such that their portions to be engaged with each other are in sufficient engagement and that the collision cell 40 is airtight.

In view of such circumstances, the portions of the ampul holder 14 and the collision cell 40, which portions are to be engaged with each other, are preferably made for example in the form of a male screw and in the form of a female screw, respectively. FIG. 5 shows such a configuration.

The configuration makes it possible to create a state in which the ampul holder 14 and the collision cell 40 are screwed together and those portions of the ampul holder 14 and the collision cell 40 are in sufficient engagement with each other. Accordingly, it is possible to prevent, when the temperature control system 50 controls the temperature inside the collision cell 40, the temperature from becoming difficult to control because of outside air flowing into the collision cell 40 or air flowing out of the collision cell 40.

Other Constituents (Stoppers 80*a* and 80*b* and Protection Cap 82)

Figure 6:
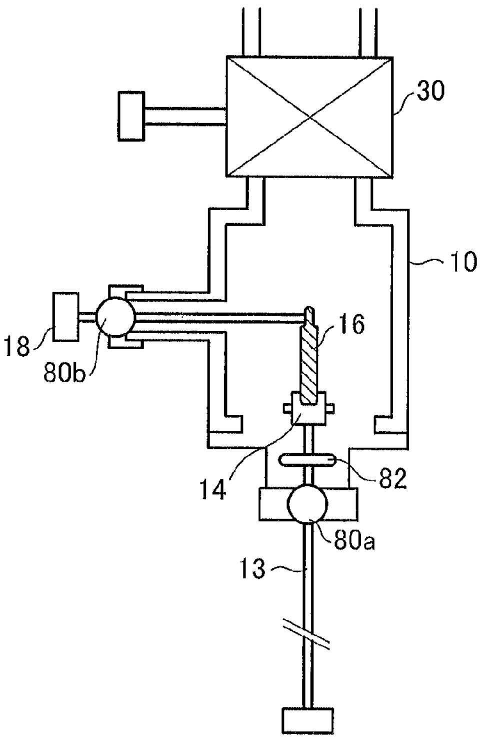
FIG. 6 is a view for schematically describing stoppers and a protection cap.
Figure 7:
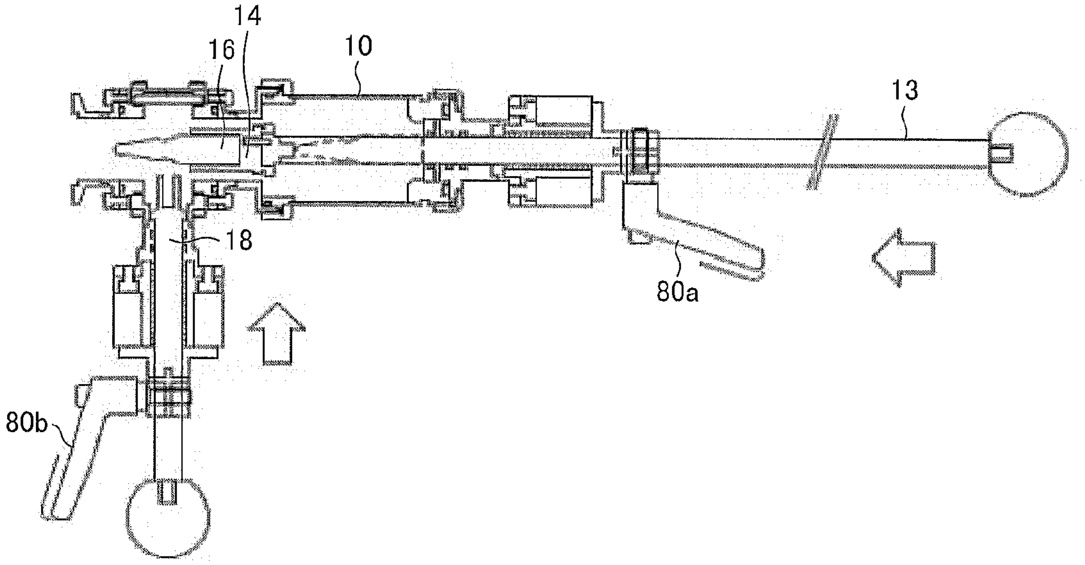
FIG. 7 is a view for describing an example of stoppers.

The following description discusses, with reference to FIGS. 6 and 7, other constituents of the alkali metal introduction apparatus 1, i.e., stoppers 80*a* and 80*b* and a protection cap 82. FIG. 6 is a view for schematically describing the stoppers 80*a* and 80*b* and the protection cap 82. Descriptions of the same constituents as those described with reference to FIG. 1 are omitted here.

As described earlier, the ampul 16 is fractured by the ampul fracturing section 18 in the dedicated fracture chamber 10. Note here that the dedicated fracture chamber 10 is evacuated with use of the vacuum pump 60*a* (this is described later). Therefore, without means for addressing a vacuum, the ampul introducing section 12 and the ampul fracturing section 18 may be suctioned and, in the worst case, may cause breakage etc.

In view of the circumstances, it is preferable to provide the stopper 80*a* to a portion where the ampul introducing section 12 and the dedicated fracture chamber 10 abut each other or the vicinity of the portion, and to provide the stopper 80*b* to a portion where the ampul fracturing section 18 and the dedicated fracture chamber 10 abut to each other or the vicinity of the portion. The stoppers 80*a* and 80*b* can be realized by any known technique.

FIG. 7 is a view for describing one embodiment of the stoppers 80*a* and 80*b*. As illustrated in FIG. 7, the introduction shaft 13 is provided with the stopper 80*a*, and a shaft of the ampul fracturing section 18 is provided with the stopper 80*b*. Note here that each of the stoppers 80*a* and 80*b* is in the form of a handle. The introduction shaft 13 and the shaft of the ampul fracturing section 18 are fixed, by turning the handles, so as not to move.

The following description discusses the protection cap 80 with reference to FIG. 6. As described earlier, the ampul 16 is fractured by the ampul fracturing section 18 in the dedicated fracture chamber 10. When the ampul 16 is fractured, a broken piece of the ampul 16 may fall and damage an O-ring provided in a portion where the dedicated fracture chamber 10 and the ampul introducing section 12 are joined together. In view of this, the protection cap 82 for covering the O-ring is provided so as to cover the top of the O-ring.

This makes it possible, although a broken piece of the ampul 16 may fall onto the protection cap 82, to prevent the broken piece from falling onto the O-ring and thus possible to protect the O-ring. Such a protection cap 82 can be realized by any known technique.

Flow (Operations) of Alkali Metal Introduction Method

Figure 8:
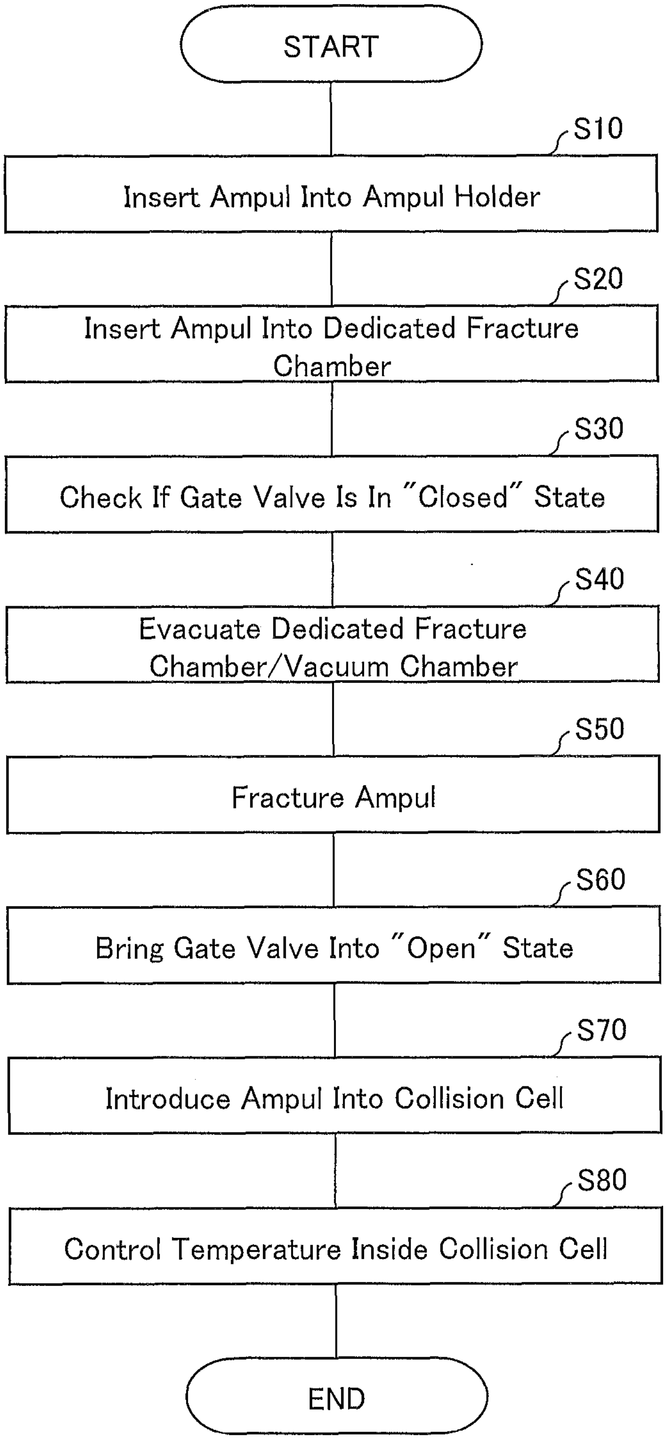
FIG. 8 is a flowchart for describing an alkali metal introduction method.

The following description discusses, with reference to FIG. 8, an alkali metal introduction method in accordance with the present invention. FIG. 8 is a flow chart for describing the alkali metal introduction method.

First, in S10, the ampul 16 is inserted into the ampul holder 14. Note here that the ampul introducing section 12 is positioned completely outside the dedicated fracture chamber 10. The ampul 16 in which a desired alkali metal is encapsulated is inserted into the ampul holder 14 by an operator.

Next, in S20, the ampul introducing section 12 holding the ampul 16 thereon is inserted into the dedicated fracture chamber 10. Since the ampul 16 will later be fractured by the ampul fracturing section, the operator looks through a transparent window of the dedicated fracture chamber 10 into the dedicated fracture chamber 10 and inserts the ampul 16 into a predetermined position (exposure position) where the ampul 16 is to be fractured.

Note that, even in a case where the dedicated fracture chamber 10 is not provided with the transparent window, it is possible for the ampul 16 to be located in the exposure position by (i) marking the introduction shaft 13 and (ii) inserting the ampul introducing section 12 into the dedicated fracture chamber 10 until the mark is reached.

Next, in S30, the gate valve 30 is brought into the "closed" state. This separates the dedicated fracture chamber 10 and the vacuum chamber 20. Note that in a case where the dedicated fracture chamber 10 and the vacuum chamber 20 are integral with each other, this step is omitted because no gate valve 30 is provided.

After that, in S40, the dedicated fracture chamber 10 and the vacuum chamber 20 are evacuated with use of the vacuum pump 60*a* and the vacuum pump 60*b*, respectively. This makes it possible to remove moisture out of the dedicated fracture chamber 10 and the vacuum chamber 20.

Then, in S50, the ampul 16 located in the exposure position is fractured by the ampul fracturing section 18.

More specifically, the ampul 16 is configured to be easily broken at its border part 16*c* between the ampul's lower part 16*a* and the ampul's upper part 16*b* when external force is applied to the ampul's upper part 16*b*. The ampul 16 is broken at its border part 16*c* into the ampul's lower part 16*a* and the ampul's upper part 16*b* by the ampul fracturing section 18 applying external force to the ampul's upper part 16*b*. This causes the alkali metal encapsulated in the ampul 16 to be exposed out of the ampul 16.

In this step, the inside of the dedicated fracture chamber 10 is maintained under vacuum, and thus contains little moisture. This prevents the alkali metal exposed out of the ampul 16 from reacting with moisture inside the dedicated fracture chamber 10 and igniting.

Next, in S60, the gate valve 30 is brought into the "open" state. This brings the dedicated fracture chamber 10 and the vacuum chamber 20 into communication.

Note that, in the step of S40, the vacuum chamber 20 is also maintained under vacuum, and thus contains no moisture inside. Therefore, even when the gate valve 30 is brought into the "open" state, it is possible to prevent the alkali metal exposed out of the ampul 16 from reacting with moisture inside the vacuum chamber 20 and igniting.

Next, in S70, the ampul 16 is introduced into the collision cell 40. This is achieved by pushing the ampul introducing section 12 in the A direction of FIG. 1 to thereby introduce the ampul 16 into the collision cell 40.

Since how to bring the ampul holder 14 and the collision cell 40 into engagement was described with reference to FIG. 5, its detailed description is omitted here.

After that, in S80, the temperature inside the collision cell 40 is controlled by the temperature control system 50 to a target temperature.

To what extent the temperature is adjusted varies depending on the type of an alkali metal encapsulated in the ampul 16 and desired density of an alkali metal vapor produced by vaporization in the collision cell 40. Note, however, that the temperature control technique using a combination of liquid nitrogen and a heater is a technique used in plants etc. although it is not used in this field, and is capable of controlling the temperature inside the collision cell 40 within ±0.5° C. of the target temperature.

The foregoing description discussed the alkali metal introduction method in accordance with the present invention.

Note here that the steps of S20 to S80 can be either carried out manually or all controlled automatically.

It is preferable that, for the purpose of removing water molecules attached to the inside of an alkali metal introduction system and a reaction room for two mass spectrometers, the alkali metal introduction system and the reaction room be heated (bake out) prior to an experiment. This operation makes it possible to reduce background noise caused by impurities inside the mass spectrometers, and further possible to prevent the alkali metal form reacting with water molecules and being unnecessarily consumed when an alkali metal vapor is introduced into the reaction room.

Effects Brought About by Alkali Metal Introduction Apparatus 1 and Alkali Metal Introduction Method The following description discusses the effects brought about by the alkali metal introduction apparatus 1 and the alkali metal introduction method.

The alkali metal introduction apparatus 1 is for use in experiments in which alkali metal vapors are used, and includes: the dedicated fracture chamber 10 and the vacuum chamber 20; the vacuum pumps 60*a* and 60*b* for evacuating the dedicated fracture chamber 10 and the vacuum chamber 20; the ampul fracturing section 18 for causing, in the dedicated fracture chamber 10, an alkali metal encapsulated in the ampul 16 to be exposed out of the ampul 16 by deforming the ampul 16; the collision cell 40 configured to allow the ampul 16 to be introduced therein, the collision cell 40 being provided inside the vacuum chamber 20; and the ampul introducing section 12 for moving the ampul 16 between the exposure position where the alkali metal is to be exposed out of the ampul 16 thus deformed and the introduction position where the ampul 16 is to be introduced into the collision cell 40.

Further, the alkali metal introduction method in accordance with the present invention is for use in experiments in which alkali metal vapors are used, and includes the steps of: evacuating the dedicated fracture chamber 10 in which the ampul 16 is located, in which ampul 16 an alkali metal is encapsulated, and thereafter; causing the alkali metal to be exposed out of the ampul 16 by deforming the ampul 16 and thereafter; moving the ampul 16 between the exposure position where the alkali metal is exposed out of the ampul 16 thus deformed and the introduction position where the ampul 16 is to be introduced into the collision cell 40 which is provided inside the chamber and is configured to allow the ampul 16 to be introduced therein.

In conventional experiments in which alkali metal vapors are used, for example in a case of tandem mass spectrometry, it has been known that using an alkali metal vapor as a target gas dramatically improves the accuracy of a structural analysis as compared to the case where an inert gas is used as the target gas. In spite of this, in general, an inert gas is more often used as a target gas. This is due to difficulty in handling alkali metals. Alkali metals ignite when they react with moisture in air, and cause burn injury when they make contact with a hand. This is why the use of alkali metals as target gases has been avoided and spread of them has been hampered.

In this regard, according to the alkali metal introduction apparatus 1 (and the alkali metal introduction method in accordance with the present invention), the vacuum pumps 60*a* and 60*b* (step of creating a vacuum) evacuate the dedicated fracture chamber 10 and the vacuum chamber 20, respectively. Then, the ampul fracturing section 18 (step of causing the alkali metal to be exposed) causes, in the dedicated fracture chamber 10, the alkali metal encapsulated in the ampul 16 to be exposed out of the ampul 16 by deforming the ampul 16. Further, the ampul introducing section 12 (step of moving the container) moves the ampul 16 between the exposure position where the alkali metal is to be exposed out of the ampul 16 thus deformed and the introduction position where the ampul 16 is to be introduced into the collision cell 40 which is provided inside the vacuum chamber 20 and is configured to allow the ampul 16 to be introduced therein. As such, the alkali metal introduction apparatus 1 makes it possible to introduce, into the collision cell 40, the ampul 16 out of which the alkali metal is exposed.

Specifically, according to the alkali metal introduction apparatus 1, the ampul fracturing section 18 (step of causing the alkali metal to be exposed) causes, in the dedicated fracture chamber 10, the alkali metal encapsulated in the ampul 16 to be exposed out of the ampul 16 by deforming the ampul 16. Since the dedicated fracture chamber 10 has been evacuated by the vacuum pump 60*a* (step of creating a vacuum), moisture inside the dedicated fracture chamber 10 has been discharged out of the chamber. Therefore, it is possible to prevent the alkali metal from reacting with moisture inside the dedicated fracture chamber 10 and igniting.

Further, the alkali metal encapsulated in the ampul 16 is caused, in the dedicated fracture chamber 10, to be exposed out of the ampul 16 by deformation of the ampul 16 by the ampul fracturing section 18 (step of causing the alkali metal to be exposed). Therefore, it is possible to eliminate the risk of the alkali metal making contact with an operator's hand etc. and causing burn injury to the operator.

As such, it is possible to safely introduce, into the collision cell 40, an alkali metal whose use has been avoided due to difficulty in handling thereof. This makes it possible for an operator to choose to use the alkali metal introduction apparatus 1 in an experiment, such as tandem mass spectrometry, in which an alkali metal vapor is used. Using the alkali metal introduction apparatus 1 in tandem mass spectrometry makes it possible to maximize the advantage of alkali metal vapors over inert gases, which advantage is brought about when an alkali metal vapor is used for a structural analysis.

Figure 12:
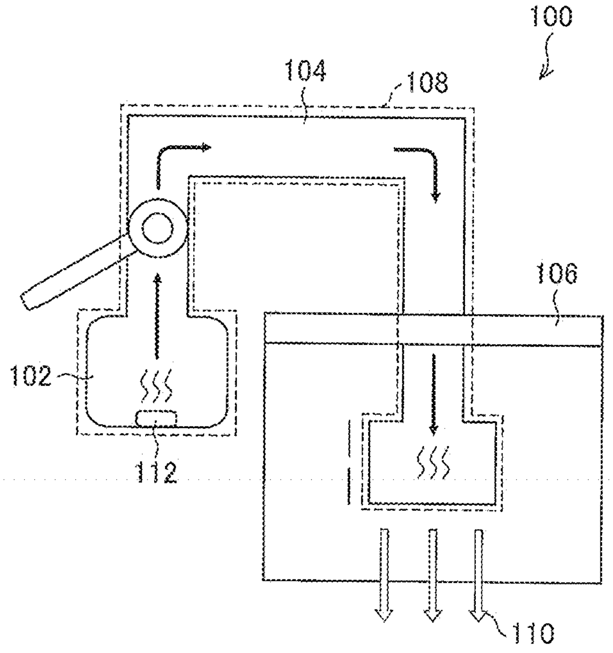
FIG. 12 is a view for schematically describing a conventional alkali metal introduction apparatus for MS/MS in which an alkali metal vapor is used as a target.

Further, according to the alkali metal introduction apparatus 1, the ampul 16 in which an alkali metal is encapsulated is directly introduced into the collision cell 40. Therefore, in a case where the collision cell 40 is used as a collision room where selected ions collide with a target gas in tandem mass spectrometry, the alkali metal is directly introduced into the collision room. This means that a path 104 described with reference to FIG. 12 is not necessary.

Specifically, according to an alkali metal introduction apparatus 100 as has been used conventionally, an alkali metal is first introduced into a reservoir 102 where it is vaporized to produce an alkali metal vapor, and the alkali metal vapor is guided through the path 104 to the collision room inside a vacuum chamber 106. In contrast, according to the alkali metal introduction apparatus 1 configured like above, it is possible to omit the path to thereby simplify the apparatus and further to cut down on cost. In addition, by omitting the pass 104, it is also possible to enjoy the following advantages. That is, complicated temperature controls are not necessary, and loss of an alkali metal vapor while the alkali metal vapor is guided to the collision room is prevented.

The alkali metal introduction apparatus 1 is preferably configured such that the ampul introducing section 12 includes an ampul holder 14 for sealing an introduction opening in the collision cell 40 into which the ampul 16 is to be introduced.

According to the alkali metal introduction apparatus 1 configured like above, the introduction opening in the collision cell 40 is sealed with the ampul holder 14. Therefore, even if some process is carried out in the collision cell 40 after the ampul 16 is introduced into the collision cell 40, a product obtained from the process is prevented from leaking out of the collision cell 40. This provides a safer apparatus to an operator.

The alkali metal introduction apparatus 1 preferably further includes a heating line 56 capable of raising the temperature inside the collision cell 40.

Into the collision cell 40, the ampul 16 in which an alkali metal is encapsulated is introduced. The alkali metal has been exposed out of the ampul 16 by the ampul fracturing section 18.

Accordingly, the alkali metal introduction apparatus 1, which includes the heating line 56 capable of raising the temperature inside the collision cell 40, makes it possible to vaporize the alkali metal exposed out of the ampul 16.

Accordingly, in experiments in which alkali metal vapors are used, for example in the case of tandem mass spectrometry, it is possible to use an alkali metal vapor as a target gas, and thus possible to dramatically improve the accuracy of a structural analysis as compared to the case where an inert gas is used as the target gas.

The configuration also brings about the following effect.

A conventional alkali metal introduction apparatus 100 controls the temperature (gas density) of an alkali metal vapor with use of not only a heater 108 provided to the collision room but also a heater 108 provided to the path 104. Therefore, even if the alkali metal is safely introduced into the reservoir 102, the density of an alkali metal vapor cannot be controlled accurately with high responsivity. Under such circumstances, it is often the case that (i) the alkali metal vapor takes several hours to reach its target density or (ii) if the density of the alkali metal vapor jumps due to inappropriate control, a large amount of an alkali metal is unnecessarily consumed.

In contrast, the alkali metal introduction apparatus 1 does not require the path 104 which is required for the conventional alkali metal introduction apparatus 100 as described earlier, and is capable of directly introducing the alkali metal into the collision cell 40. Further, the alkali metal introduction apparatus 1 includes the heating line 56 which is capable of raising the temperature inside the collision cell 40.

Accordingly, the alkali metal introduction apparatus 1 is capable of controlling the gas pressure of the alkali metal vapor inside the collision cell 40 with use of only the heating line 56, and thus is capable of controlling the gas pressure with significantly high responsivity. This makes it possible to prevent a large amount of an alkali metal from being unnecessarily consumed due to inappropriate control.

The alkali metal introduction apparatus 1 preferably further includes a cooling line 54 capable of reducing the temperature inside the collision cell 40.

A conventional alkali metal introduction apparatus 100 includes the heater 108 provided to the path 104 and to the collision room, but does not include a system of cooling heated gas.

Therefore, even if the density of an alkali metal vapor jumps due to inappropriate control, the conventional alkali metal introduction apparatus 100 cannot address this and just has to wait for the alkali metal vapor to decrease in temperature on its own. This results in unnecessary consumption of the alkali metal.

In contrast, the alkali metal introduction apparatus 1 includes the cooling line 54 capable of reducing the temperature inside the collision cell 40.

Accordingly, the alkali metal introduction apparatus 1 is capable of quickly cooling the alkali metal vapor by the cooling line 54 when the temperature of the alkali metal vapor exceeds the target temperature. That is, it is possible to control the gas pressure of the alkali metal vapor with higher responsivity, and thus possible to reduce unnecessary consumption of the alkali metal.

The alkali metal introduction apparatus 1 is configured such that: the heating line 56 is a system of raising the temperature inside the collision cell 40 by use of a heater; and the cooling line 54 is a system of reducing the temperature inside the collision cell 40 by use of liquid nitrogen.

Controlling the temperature with use of the heater and liquid nitrogen is a technique used in plants etc. The technique is capable of high-speed control of the temperature within ±0.5° C. of the set target temperature.

In view of this, by applying this technique to the field of the present invention, it is possible to carry out high-speed control of the gas pressure of the alkali metal vapor inside the collision cell 40. That is, with use of the heating line 56 using the heater and the cooling line 54 using liquid nitrogen, it is possible to carry out high-speed control of the temperature within ±0.5° C. of the set target temperature, and thus possible to realize a "high-speed switch by heat". This makes it possible to precisely control the amount of gas by switching operation of the "high-speed switch", and thus possible to realize a configuration in which an alkali metal is consumed in pulses, i.e., possible to optimize alkali metal consumption.

Example

Figure 9:
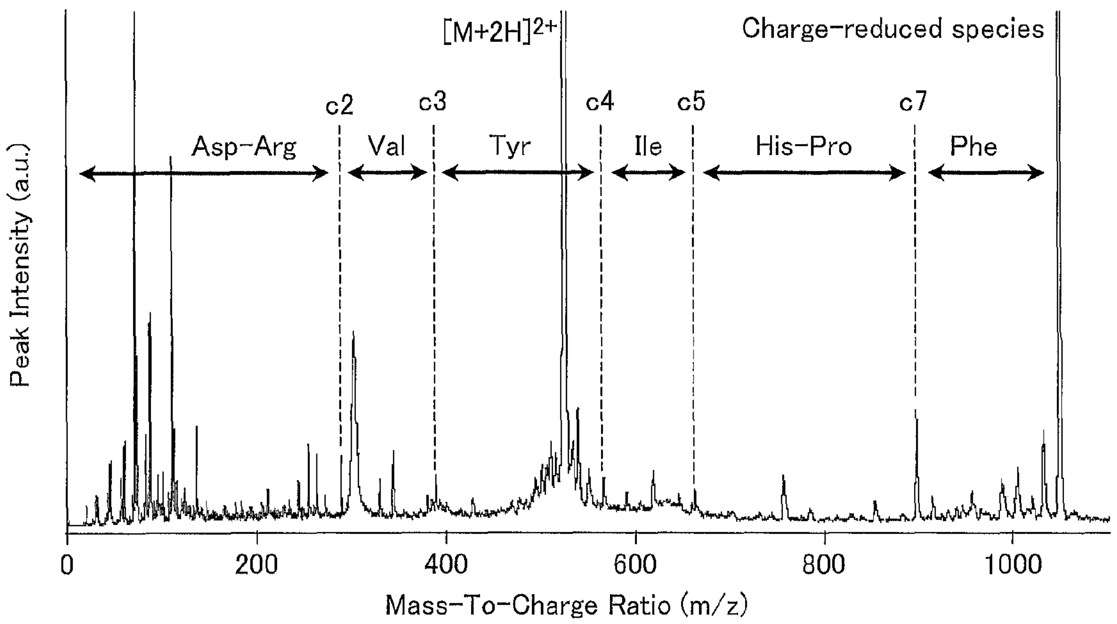
FIG. 9 is a product ion spectrum showing the results of a structural analysis of angiotensin II observed in a case where a target gas is an alkali metal vapor.
Figure 10:
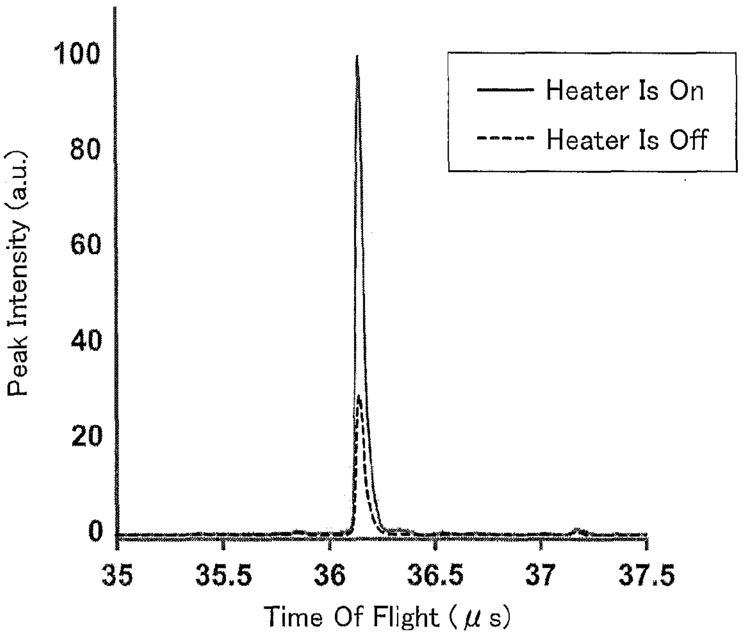
FIG. 10 is a time-of-flight spectrum showing a change in intensity of precursor ions observed when a heater is turned ON/OFF.
Figure 11:
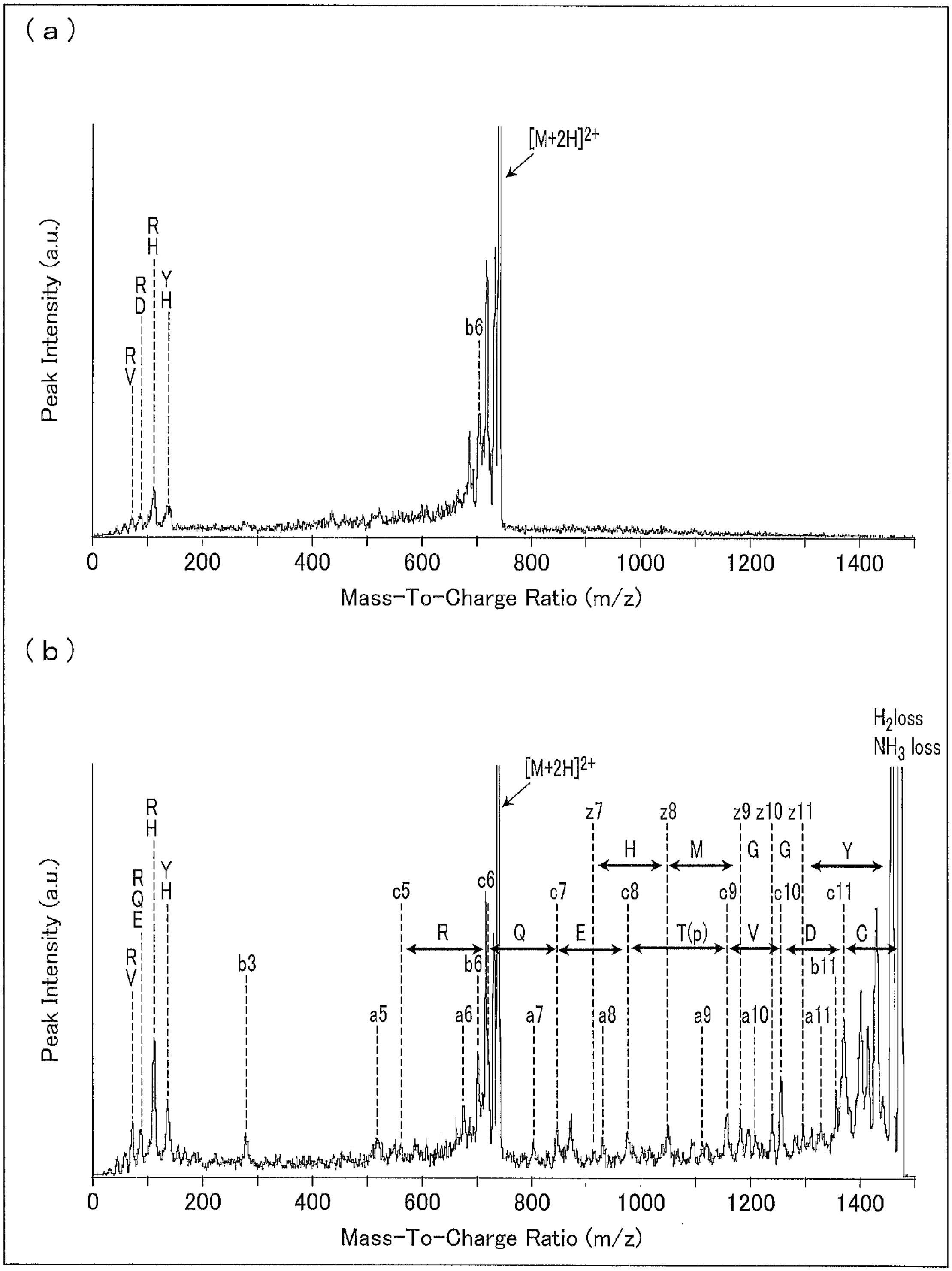
FIG. 11 shows product ion spectra each showing the results of a structural analysis of a phosphorylated peptide. (a) of FIG. 11 shows the results of a structural analysis obtained in a case where a target gas is an inert gas. (b) of FIG. 11 shows the results of a structural analysis obtained in a case where a target gas is an alkali metal vapor.

The following description discusses, with reference to FIGS. 9 and 10, an example of the alkali metal introduction apparatus 1 and the effects brought about by the alkali metal introduction apparatus 1.

FIG. 9 is a graph showing the results of a structural analysis of angiotensin II observed in a case where a target gas is an alkali metal vapor. The horizontal axis indicates mass-to-charge ratio (m/z), and the vertical axis indicates peak intensity (a.u.). The alkali metal used is cesium.

In the present example, a standard biological sample called angiotensin II (amino acid sequence: Asp-Arg-Val-Tyr-Ile-His-Pro-Phe) was used for a performance evaluation carried out with use of the alkali metal introduction apparatus 1. Note that the alkali metal introduction apparatus 1 operates according to the method described with reference to FIG. 8.

In the experiment, a vacuum was produced inside the dedicated fracture chamber 10 and the vacuum chamber 20, and thus ignition due to a reaction of the alkali metal with moisture inside the dedicated fracture chamber 10 and the vacuum chamber 20 did not occur. Further, the alkali metal was introduced into the collision cell 40 without problems.

After the alkali metal was introduced into the collision cell 40, the target temperature inside the collision cell 40 was set to 130° C., and the temperature was controlled with use of the heating line 56 and the cooling line 54. As a result, the target temperature (130° C.) was reached only in a few minutes, and the deviation of the temperature was within ±0.5° C.

FIG. 9 is a graph showing the results of a structural analysis of angiotensin II observed in this experiment, which graph shows the results of a structural analysis carried out by causing ions of angiotensin II to collide with the alkali metal vapor (target gas).

As shown in FIG. 9, fragment ions produced from collision with the target gas were observed, and an amino acid sequence was determined from intervals between their peaks. Further, the deviation of the temperature was constantly within ±0.5° C., and therefore data was able to be obtained stably.

After that, when the heater of the heating line 56 was turned OFF so that only the liquid nitrogen line of the cooling line 54 was in the ON state, the temperature inside the collision cell 40 decreased to 100° C. or lower only in a few minutes. This stopped the alkali metal from being vaporized. The results are shown in FIG. 10. FIG. 10 is a graph showing a change in intensity of precursor ions observed when the heater is turned ON/OFF. The horizontal axis indicates time of flight (us), and the vertical axis indicates peak intensity (a.u.).

As is clear from FIG. 10, the peak intensity of the alkali metal vapor is significantly low when the heater is in the OFF state. Further, the temperature inside the collision cell 40 is controlled quickly. Therefore, it is possible to minimize unnecessary consumption of the alkali metal by turning ON/OFF the heater. Furthermore, although not described in the present example, turning ON/OFF the liquid nitrogen line brings about the same effects as those brought about by turning ON/OFF the heater.

As has been described, the present example shows a technique of controlling the temperature with use of a heater and liquid nitrogen. This technique is used in plants etc., and is capable of high-speed control of the temperature within ±0.5° C. of the set target temperature.

Accordingly, it is possible to carry out high-speed control of gas pressure of the alkali metal vapor inside the collision cell 40 by controlling ON/OFF states of the cooling line 54 and the heating line 56. That is, it is possible to realize a "high-speed switch by heat". This makes it possible to precisely control the amount of gas by switching operation of the "high-speed switch", and thus possible to realize a configuration in which an alkali metal is consumed in pulses. As such, it is possible to minimize unnecessary consumption of the alkali metal.

Other (Alkali Metal in Cartridge Etc.)

The foregoing descriptions are based on the assumption that the ampul 16 can be a commercially available one and has the shape and characteristics described with reference to FIG. 3.

Note however that, depending on how the ampul 16 is fractured by the ampul fracturing section 18 and to what extent the ampul 16 is fractured, an alkali metal encapsulated in the ampul 16 may fall into the dedicated fracture chamber 10. If this is the case, the dedicated fracture chamber 10 may decay due to the alkali metal or hydroxides may form inside the dedicated fracture chamber 10 and contaminants accumulate.

In this regard, if the ampul 16 is constituted by a cartridge etc. which has a lid removably attached thereto, it is possible to open the lid by a lid opening/closing section (exposing section) which has the same function as the ampul fracturing section 18, i.e., a function of causing an alkali metal encapsulated in the cartridge to be exposed out of the cartridge. This makes it possible to prevent the alkali metal from falling into the dedicated fracture chamber 10.

Accordingly, even if an alkali metal contained in a cartridge becomes commercially available in the future, the alkali metal introduction apparatus 1 is suitably applicable to such a cartridge.

In addition, in a case where the ampul 16 is constituted by a cartridge or where the steps of S20 to S80 described with reference to FIG. 8 are controlled automatically, even a non-skilled operator can safely use the alkali metal introduction apparatus 1. This is in contrast to a conventional alkali metal introduction apparatus 100 which can be used only by a skilled operator because of difficulty in handling alkali metals, and greatly helps spread the use of an alkali metal vapor as a target gas.

As has been described, the alkali metal introduction apparatus 1 has a dramatically improved usability as compared to a conventional alkali metal introduction apparatus 100.

The present invention is not limited to the descriptions of the respective embodiments, but may be altered within the scope of the claims. An embodiment derived from a proper combination of technical means altered within the scope of the claims is encompassed in the technical scope of the invention.

INDUSTRIAL APPLICABILITY

The present invention relates to a highly usable alkali metal introduction apparatus and an alkali metal introduction method, and is suitably usable in particularly mass spectrometers for analyzing biopolymers such as proteins and peptides.

REFERENCE SIGNS LIST

1 Alkali metal introduction apparatus
10 Dedicated fracture chamber (chamber)
12 Ampul introducing section (container moving section)
13 Introduction shaft (container moving section)
14 Ampul holder (container sealing section)
16 Ampul (encapsulation container)
16*a* Ampul's lower part (encapsulation container)
16*b* Ampul's upper part (encapsulation container)
16*c* Border part (encapsulation container)
18 Ampul fracturing section (exposing section)
20 Vacuum chamber (chamber)
30 Gate valve
40 Collision cell (container introduction room)
50 Temperature control system
52 Liquid nitrogen container
54 Cooling line (cooling system)
56 Heating line (heating system)
60*a* and 60*b* Vacuum pump (vacuum creating section)
70 Position control device
80*a* and 80*b* Stopper
82 Protection cap

The invention claimed is:

1. An alkali metal introduction apparatus for use in an experiment in which an alkali metal vapor is used, comprising:

a hollow chamber;

a vacuum creating section for evacuating the chamber;

an exposing section for causing, in the chamber, an alkali metal encapsulated in an encapsulation container to be exposed out of the encapsulation container by deforming the encapsulation container;

a container introduction room configured to allow the encapsulation container to be introduced therein, the container introduction room being provided inside the chamber; and a container moving section for moving the encapsulation container between an exposure position which is a position different from a position where the container introduction room is provided and at which the alkali metal is to be exposed out of the encapsulation container thus deformed and an introduction position where the encapsulation container thus deformed is to be introduced into the container introduction room.

2. The alkali metal introduction apparatus according to claim 1, wherein the container moving section includes a container sealing section for sealing an introduction opening in the container introduction room into which the encapsulation container is to be introduced.

3. The alkali metal introduction apparatus according to claim 1, further comprising a heating system capable of raising the temperature inside the container introduction room.

4. The alkali metal introduction apparatus according to claim 3, further comprising a cooling system capable of reducing the temperature inside the container introduction MOM.

5. The alkali metal introduction apparatus according to claim 4, wherein:

the heating system is a system of raising the temperature inside the container introduction room by use of a heater; and the cooling system is a system of reducing the temperature inside the container introduction room by use of liquid nitrogen.

6. An alkali metal introduction method for use in an experiment in which an alkali metal vapor is used, comprising the steps of:

evacuating a hollow chamber in which an encapsulation container is located, in which encapsulation container an alkali metal is encapsulated, and thereafter;

causing the alkali metal to be exposed out of the encapsulation container by deforming the encapsulation container and thereafter;

moving the encapsulation container between an exposure position which is a position different from a position where the container introduction room is provided inside the chamber and at which the alkali metal is exposed out of the encapsulation container thus deformed and an introduction position where the encapsulation container thus deformed is to be introduced into the container introduction room, the container introduction room being provided inside the chamber and configured to allow the encapsulation container to be introduced therein.

* * * * *

UNITED STATES PATENT AND TRADEMARK OFFICE

CERTIFICATE OF CORRECTION

PATENT NO. : 9,117,643 B2
APPLICATION NO. : 13/580047
DATED : August 25, 2015
INVENTOR(S) : Michisato Toyoda et al.

It is certified that error appears in the above-identified patent and that said Letters Patent is hereby corrected as shown below:

In the claims
Column 22, line 16, "MOM" should read --room--

Signed and Sealed this
Twenty-ninth Day of December, 2015

Michelle K. Lee
*Director of the United States Patent and Trademark Office*